Jan. 18, 1955     W. S. FLETCHER     2,699,908
HANGER ON AIRCRAFT FOR JETTISONABLE OBJECTS
Filed Feb. 15, 1951     4 Sheets-Sheet 1
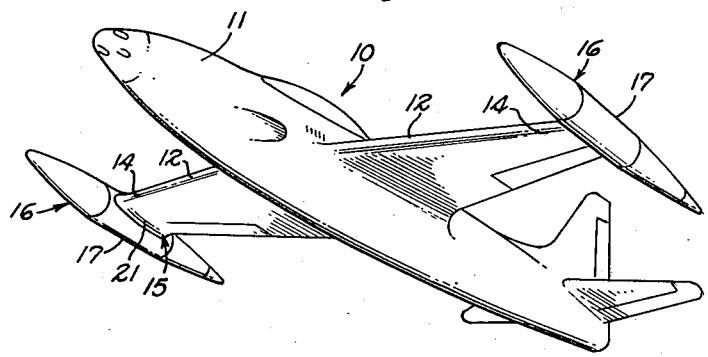
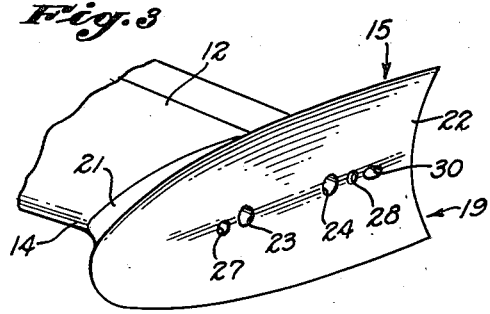
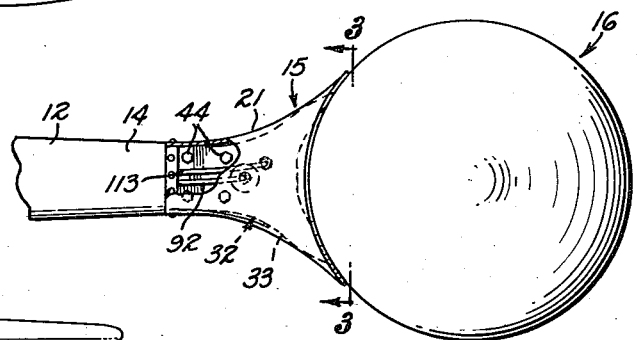
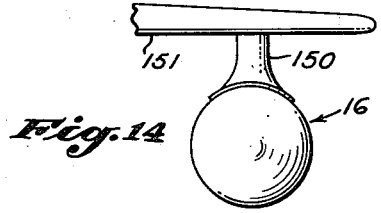
INVENTOR:
WENDELL S. FLETCHER
BY HIS ATTORNEYS
HARRIS, KIECH, FOSTER & HARRIS

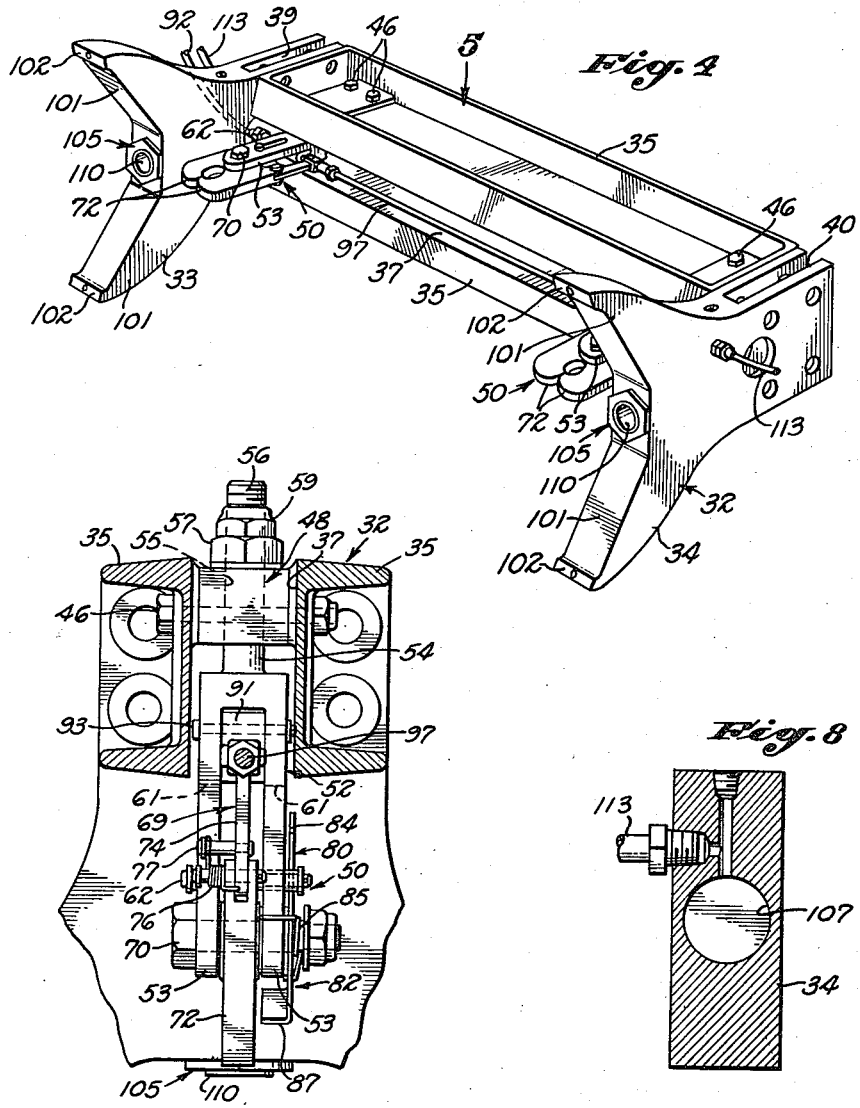

INVENTOR:
WENDELL S. FLETCHER
BY HIS ATTORNEYS
HARRIS, KIECH, FOSTER & HARRIS

Jan. 18, 1955 W. S. FLETCHER 2,699,908
HANGER ON AIRCRAFT FOR JETTISONABLE OBJECTS
Filed Feb. 15, 1951 4 Sheets-Sheet 4
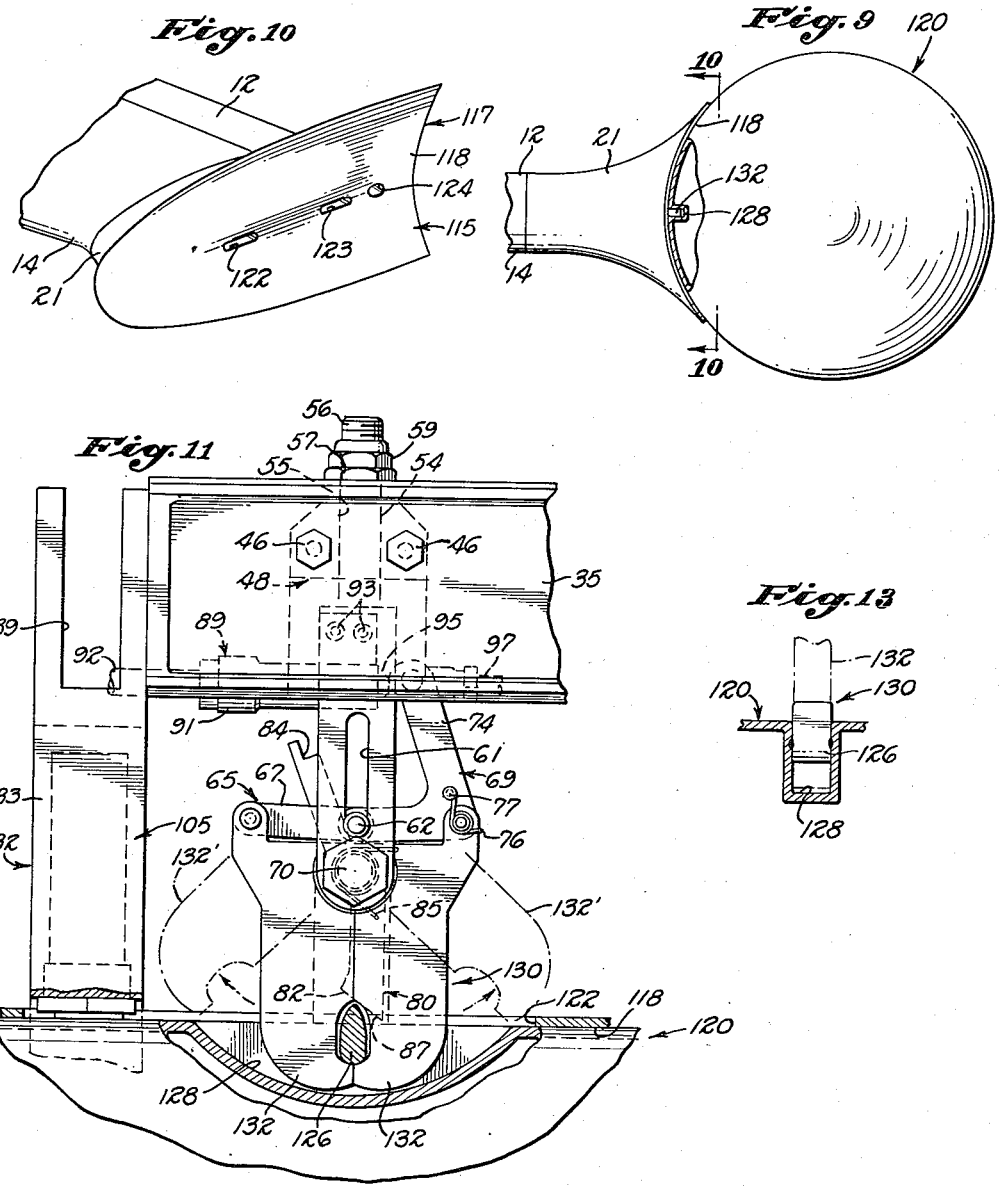
INVENTOR:
WENDELL S. FLETCHER
BY HIS ATTORNEYS
HARRIS, KIECH, FOSTER & HARRIS

United States Patent Office 2,699,908
Patented Jan. 18, 1955

2,699,908

HANGER ON AIRCRAFT FOR JETTISONABLE OBJECTS

Wendell S. Fletcher, South Pasadena, Calif.

Application February 15, 1951, Serial No. 211,155

8 Claims. (Cl. 244—137)

This invention relates to a hanger adapted to be utilized in conjunction with aircraft to temporarily suspend disposable or droppable objects upon the aircraft to permit said aircraft to transport said droppable or disposable objects.

The development of high speed aircraft, and particularly aircraft of the jet powered type which consume large quantities of fuel, has created a need for the provision of auxiliary fuel storage means which can be carried by the aircraft until the fuel supply stored therein has been exhausted and which can then be jettisoned to reduce the over-all weight of the aircraft and permit its return to the home base. Although my invention will be described as utilized for the suspension of disposable or jettisonable fuel tanks from aircraft, it is not intended that the use of the invention be limited to any particular object since it is obvious that various types of objects, such as bombs or food or weapon containers, could be carried by an aircraft equipped with my invention.

It is a primary object of my invention to provide a hanger for temporarily mounting disposable or jettisonable objects upon an aircraft which includes a receptacle adapted to receive such an object, said receptacle being aerodynamically designed to present minimal resistance to the flight of the aircraft.

An additional object of my invention is the provision of a hanger for temporarily supporting an object on an aircraft which includes a receptacle which conforms substantially to the configuration of the portion of the object disposed within the receptacle and which thus presents minimal resistance to the flight of the aircraft and substantially reduces the drag encountered in the use of conventional expedients.

A further object of my invention is the provision of a hanger of the aforementioned type which includes a receptacle mounted on the wing of the aircraft with which it is associated, said receptacle being faired to the wing to reduce a minimum the drag encountered by the aircraft. An associated object of my invention is the provision of a receptacle of the aforementioned type which includes a concave surface adapted to conform substantially to the configuration of an object deposited therein, the engagement between the surface of the receptacle and the object such that buffeting and drag are reduced to the minimum.

Another object of my invention is the provision of a hanger of the aforementioned type which has associated therewith supporting means secured to the interior of the wing for engaging the under side of the concave surface of the receptacle to support an object in said receptacle.

Another object of my invention is a hanger adapted to support an object on an aircraft with which the hanger is associated, said hanger including shackle means mounted adjacent a receptacle secured to the wing of said aircraft so that said shackle means may engage attachment means on said object to maintain said object in said receptacle.

An additional object of my invention is the provision of a hanger of the aforementioned type in which the shackle means is mounted interiorly of the aircraft wing and is adjustable with respect to the aforesaid receptacle to permit the shackle means to be advanced toward and away from said receptacle within the wing structure to facilitate the accommodation of various sizes of objects in the receptacle.

A further object of my invention is the provision in a hanger of the aforementioned type of shackle means which is movable with respect to the aforesaid receptacle from a first position in which it engages attachment means on an object to a second position in which it releases said attachment means to facilitate the jettisoning of said object from said receptacle.

Another object of my invention is the provision of a hanger of the aforementioned type which includes shackle means having lock means associated therewith adapted to maintain the shackle means in attachment means releasing position which is also the position in which the shackle means is adapted to receive said attachment means.

An additional object of my invention is the provision of hanger means of the aforementioned type which includes ejector means adapted to engage the object supported in the hanger means to cause the ejection of the object from the receptacle of the hanger and to prevent the possibility of the object striking the wing or fuselage of the aircraft after the object has been released from the hanger.

A further object of my invention is the provision of a hanger of the aforementioned character in which said shackle means is dimensioned to fit snugly within receptacles in said object when said shackle means engages said attachment means so that said shackle means may maintain said object in said receptacle under shear loads imposed thereupon.

Other objects and advantages of my invention will be apparent from the following specification and the accompanying drawings, which are for the purpose of illustration only, and in which:

Fig. 1 is a perspective view showing a jet powered aircraft having mounted upon the wing thereof hangers constructed in accordance with my invention;

Fig. 2 is an enlarged, fragmentary, front elevational view showing a disposable fuel tank supported temporarily by a hanger constructed in accordance with my invention;

Fig. 3 is a fragmentary, end elevational view taken from the broken line 3—3 of Fig. 2;

Fig. 4 is an isometric view showing the mechanism of the hanger of my invention;

Fig. 7 is a vertical, partly sectional view taken from the broken line 7—7 of Fig. 5;

Fig. 8 is a transverse, sectional view taken from the broken line 8—8 of Fig. 5;

Fig. 9 is a fragmentary, partly sectional view showing an alternative embodiment of my invention;

Fig. 10 is an end elevational view taken from the broken line 10—10 of Fig. 9;

Fig. 11 is a top plan view of the shackle construction of the alternative embodiment;

Fig. 12 is a fragmentary view of a fuel cell for use with the alternative embodiment;

Fig. 13 is a fragmentary, transverse sectional view taken from the broken line 13—13 of Fig. 12; and Fig. 14 is a fragmentary view of an alternative suspension of the hanger.

Figure 5:
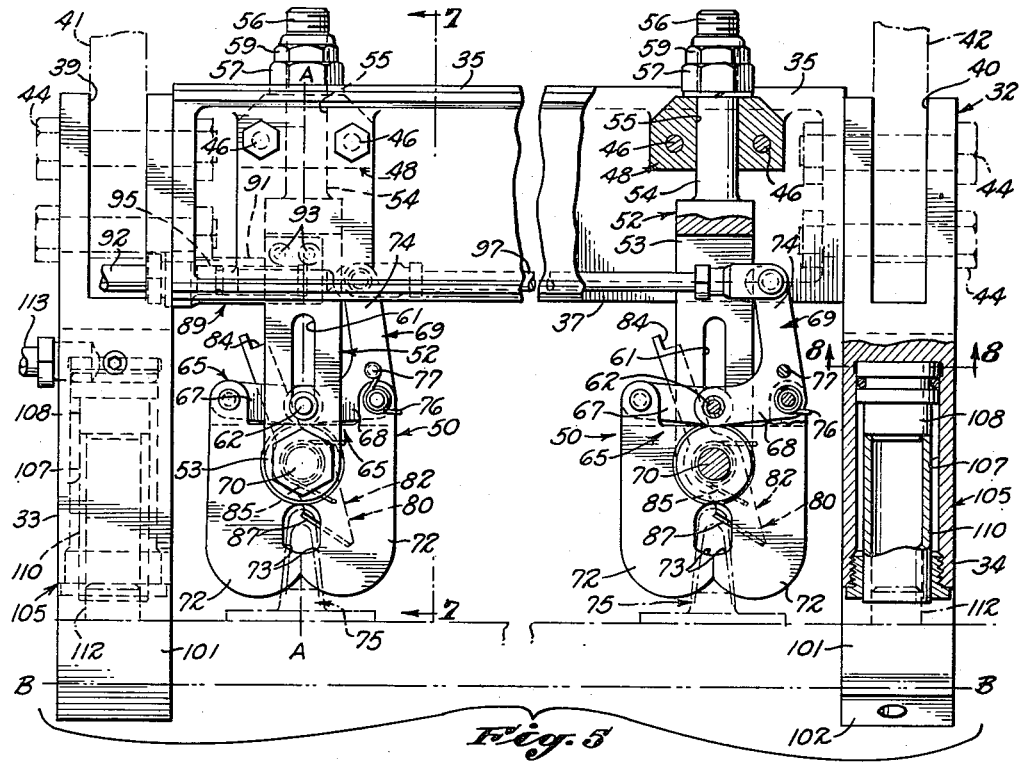
Fig. 5 is an enlarged plan view taken in the direction of the arrow 5 of Fig. 4 and showing the attachment means of an object engaged by the shackles of the hanger of my invention.

Referring to the drawings and particularly to Figs. 1-4 thereof, I show an aircraft 10 which is powered with a jet engine, not shown, mounted in the fuselage 11 which has a wing 12 secured to the opposite sides thereof. Secured to the ends 14 of the wing 12 are hangers 15 constructed in accordance with my invention. Since the hangers 15 are identical in construction, with the exception that the component portions thereof face in opposite directions, only one of the hangers will be described, it being understood that the components of the oppositely positioned hanger are identical but oppositely oriented.

Suspended in each of the hangers 15 is a disposable fuel cell 16 having an intermediate section 17 of substantially cylindrical cross section, said intermediate cylindrical section being received in a receptacle 19 constituting a portion of the hanger 15. The hanger 15 constitutes the entire hanger assembly which is the subject matter of this application, while the receptacle 19 constitutes only the portion thereof in which the object fits.

The hanger 15 and the receptacle 19 constituting a portion thereof are faired into the end of the wing 12 by a conventional fillet construction 21, said fillet construction being designed to reduce drag and to fair the hanger 15 smoothly into the external wing structure. The receptacle 19 of the hanger 15 includes a concave surface 22, said surface being elongated in a plane extending substantially parallel to the longitudinal axis of the fuselage 11 of the aircraft 10 and being substantially perpendicular to the span of the wing with which it is associated. It should be noted that the receptacle 19 and, more particularly, the concave surface 22 thereof, is of airfoil configuration and thus do not greatly increase the drag encountered by the aircraft in flight when the disposable fuel cell 16 is released from the receptacle 19. It should also be noted that, although the invention is described as being utilized to temporarily mount a disposable fuel cell upon the aircraft, it is not intended that the hanger of my invention be limited to this specific purpose, it being conceivable that bombs, weapon carriers, and like containers be mounted in the hanger of my invention.

A plurality of openings which communicate with the interior of the hanger 15 is provided in the surface 22 of the receptacle 19, said openings including first and second attachment means receiving openings 23 and 24, respectively, and first and second shear pin receiving openings 27 and 28, respectively. Also provided is an opening 30 which permits fuel and air line connections, not shown, to be made with the interior of the disposable fuel cell 16 so that fuel can be forced from the interior of the tank by air passing through the air line and fuel can be passed through the fuel line to the jet power plant, not shown. It should be noted that the openings are maintained at a minimal size so that the surface 22 of the receptacle 19 will be substantially uninterrupted to provide a minimum resistance to the flow of air therepast.

Underlying the surface 22 of the receptacle 19, adapted to support said surface in a manner to be described in greater detail below and constituting a portion of said receptacle is a sway brace 32 (Fig. 4), said sway brace including laterally spaced arms 33 and 34 which are maintained in operative relationship with each other by means of ribs 35 disposed therebetween. The ribs 35 are spaced one above the other and define an elongated opening 37 for a purpose which will be described in greater detail below. Formed in the inner ends of the arms 33 and 34, respectively, of the sway brace 32 are mounting slots 39 and 40, said slots being adapted to receive, respectively, the ends of the fore and aft wing beams 41 and 42 to permit the sway brace 32 to be integrated with the structure of the wing and secured thereto by means of bolts 44 which pass through contiguous orifices in the sway brace and the wing beams, as best shown in Fig. 5 of the drawings.

Positioned between the ribs 35 in the space 37 and secured to the webs of said ribs 46 is a pair of shackle mounting blocks 48 and adjustably suspended from each of the mounting blocks 48, in a manner to be described in greater detail below, is a pair of shackles 50. Since the construction of the shackles 50 is identical and since each of the shackles is mounted on its respective mounting block 48 in the same manner, the description of the shackles will be limited to one of the pair, it being understood that the invention is not to be limited to the use of a pair of shackles since it is conceivable that one shackle or more than a pair of shackles may be utilized in the practice of my invention. In describing the shackle construction shown in Figs. 5–7, the words "upper," "lower," and "vertical" will be used to refer to portions of the mechanism as they are disposed in the drawing for purposes of clarity. Each of the shackles 50 includes a yoke 52 disposed in a horizontal plane and having spaced arms 53 which terminate in a stud member 54 formed integrally with the upper end thereof, said stud member being mounted in a longitudinal opening 55 formed in the mounting block 48 and having a threaded upper end 56 engageable by an adjusting nut 57 maintained in a predetermined position with respect to the threaded upper end 56 by means of a lock nut 59. By so mounting the stud 54 of the yoke 52 in the mounting block 48, it is possible by the adjustment of the adjusting nut 57 with respect to the threaded upper end 56 of the stud 54, to shift the yoke 52, as best shown in Fig. 5 of the drawings, axially along an axis A—A which is perpendicular to an axis B—B which is the longitudinal axis of the receptacle 19. In this manner, therefore, it is possible to adjust the positions of the shackles 50 with respect to the first and second attachment means receiving openings 23 and 24 so that the position of the shackles 50 may be adjusted to permit them to accommodate disposable fuel cells 16 of varying diameters. Thus, the shackles 50 can be moved in a direction away from the under side of the surface 22 of the receptacle 19 if a smaller disposable fuel cell is to be accommodated in the hanger 15 and can be advanced in a direction toward the under side of the surface 22 of the receptacle 19 of the hanger 15 if it is desired to accommodate a fuel cell of larger size. This is a very important feature of my invention because it permits various sizes and shapes of fuel cells to be accommodated in the hanger.

Figure 6:
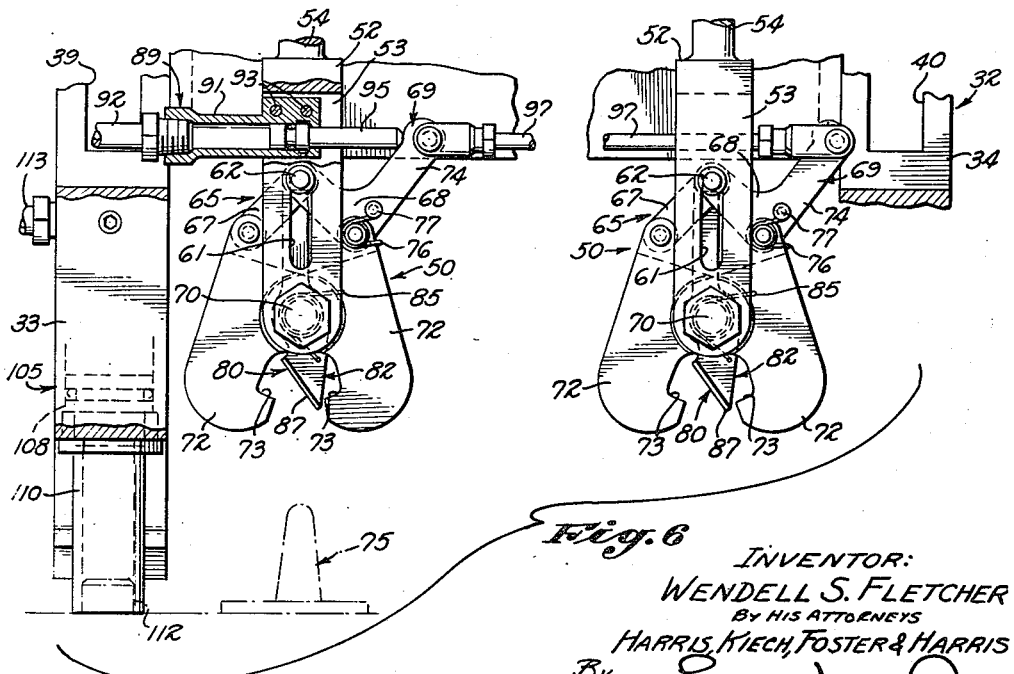
Fig. 6 is a view corresponding to that of Fig. 5 but showing the shackle means of the hanger of my invention in the position assumed by said shackle means when the attachment means of an object are released from said shackle means.

Formed in each of the arms 53 is a vertical slot 61, said slots being adapted to mount a traveling toggle pin 62 which constitutes the intermediate pivot pin of a toggle linkage indicated generally at 65, said pin 62 pivotally connecting one end of a toggle link 67 and the end of one arm 68 of a bellcrank 69. Pivotally mounted on a bolt 70 between the arms 53 of the yoke 52 is a pair of hooks 72, said hooks having attachment means engaging portions 73 which are adapted to cooperate with each other to engage attachment means 75 mounted on the intermediate cylindrical portion 17 of a disposable fuel cell 16, as best shown in Fig. 5 of the drawings. The left-hand hook 72, as seen in Figs. 5 and 6 of the drawings, has a lobe formed upon its upper end which is pivotally secured to the other end of the link 67 while the right-hand hook 72 has a lobe formed upon its upper end which pivotally engages the point of intersection between the arm 68 of the bellcrank 69 and the other arm 74 thereof. Mounted at the point of pivotal attachment between the upper end of the right-hand hook 72 and the bellcrank 69 is a spring 76 which has its opposite ends engaging, respectively, a pin 77 mounted on the bellcrank and the edge of the upper portion of the right-hand hook 72.

As best shown in Fig. 6 of the drawings, when the shackle 50 and the hooks 72 constituting a portion of said shackle are in open, attachment means receiving position, the traveling pin 62 is carried upwardly to the upper ends of the slots 51, the engagement of the pin 62 with said ends of said slots limiting the opening of the hooks 72. However, the spring 76 tends to bias the hooks 72 of the shackle 50 into attachment means engaging position, as best shown in Fig. 5 of the drawings, but there is provided a locking means, indicated generally at 80, which serves to maintain the hooks 72 of the shackle 50 in attachment means receiving position. It should be noted here that the attachment means receiving position of the hooks 72 of the shackle 50 is identical with the attachment means releasing position wherein the attachment means 75 of a disposable fuel cell 16 are released from the shackles 50 of the hanger 15 to permit the fuel cell to be discarded.

The locking means 80 includes a locking lever 82 which is mounted for arcuate movement on the shank of the bolt 70 and has a locking detent 84, as best shown in Figs. 5 and 7 of the drawings, formed upon the upper end thereof for engagement with the traveling pin 62 when the traveling pin 62 has reached the upper ends of the slots 61 and the hooks 72 are maintained in the attachment means receiving position. When the locking detent 84 of the locking lever 82 engages the pin 62 it holds the hooks 72 open against the bias of the spring 76 which tends to move said hooks toward the attachment means engaging position by holding the pin in the upper ends of the slots 61 in the arms 53 of the yoke 52. To maintain the locking lever 82 in pin engaging position in order to prevent the hooks 72 from closing, there is provided a spring 85 which, as best shown in Figs. 5 through 7 of the drawings, encompasses a portion of the shank of the bolt 70, has its lower end engaging the lowermost end of the locking lever 82 and its upper end engaging the lower end of one of the arms 53 of the yoke 52.

Therefore, the spring 85 biases the lever 82 into a position in which the detent 84 thereof engages the pin 62 and retains it in the upper ends of the slots 61 in the arms 53 of the yoke 52. There is formed upon the lowermost end of the locking lever 82 a cam plate 87, said plate being angularly inclined with respect to the longitudinal axis of the shackle 50 and being engageable by the attachment means 75 mounted on the central portion 17 of the disposable fuel cell 16. When the attachment means 75 of the disposable fuel cell 16 is inserted between the open hooks 72, the attachment maens 75 engages the cam plate 87 and, as best shown in Figs. 5 and 6 of the drawings, urges the cam plate 87 to the right against the force of the spring 85, causing the detent portion on the upper end of the lever 82 to be shifted to the left out of engagement with the pin 62 to permit the hooks 72 to be moved into attachment means engaging position shown in Fig. 5 of the drawings, by the bias of the spring 76. Therefore, while the locking lever 82 serves to maintain the shackle 50 and, more particularly, the hooks 72 thereof in attachment means receiving position, when the attachment means is inserted between the ends of the hooks 72 and engages the locking lever 82, the pin 62 is released by the locking lever 82 to permit the hooks to move into attachment means engaging position.

Mounted between the upper ends of the arms 53 of the left-hand yoke 52, as best shown in Figs. 5 and 6 of the drawings, is an actuating means 89 including a cylinder block 91 connected by means of a hydraulic line 92 to a source of hydraulic fluid under pressure, for a purpose which will be described in greater detail below. The cylinder block 91 is secured between the arms 53 of the yoke 52 by means of pins 93, or similar fasteners. Mounted in the cylinder block 91, as best shown in Fig. 6 of the drawings, for reciprocable movement therein is a piston 95, said piston engaging the upper end of the arm 74 of the bellcrank 69 and being adapted, when energized by a remotely controlled supply of hydraulic fluid under pressure fed into the cylinder 91, to be moved toward the right, as viewed in Fig. 6 of the drawings, to cause the upper end of the bellcrank 69 to be also moved to the right. The movement of the bellcrank 69 to the right causes the toggle link to be raised from its overcenter position which it assumes when the hooks 72 are disposed in their attachment means engaging position to a position in which the pin 62 is at the upper ends of the slots 51 and the hooks 72 are disposed in their attachment means releasing and receiving positions. Pivotally connected to the upper end of the bellcrank 69 of the left-hand shackle 50 is a push rod 97 the opposite end of which is, in turn, pivotally connected to the upper end of the bell crank 69 of the right-hand shackle 50. In this manner, the energizing force of the piston 95 is communicated simultaneously to both of the shackles to cause the simultaneous movement of the hooks of said shackles into their attachment means releasing position. When moved to such positions, the hooks release the attachment means 75 of the disposable fuel cell 16 to permit said fuel cell to be dropped from the hanger 15.

When the shackles 50 are moved into their attachment means releasing position by the action of the actuator 89 and, more particularly, the piston 95 thereof, the release of the attachment means 75 of the disposable fuel cell 16 permits the cam plates 87 of the locking levers 82 to move downwardly into its normal position between the open ends of the hoks 72, as best shown in Fig. 6 of the drawings, while the detent portions 84 thereof are thus moved once again into engagement with the locking pins 62 to maintain the hooks 72 of the shackles 50 in attachment means receiving position after the power applied to the piston 95 has been released.

The arms 33 and 34 of the sway brace 32 have diverging portions 101 which provide pressure pads 102 which underlie and contact the under side of the surface 22 of the receptacle 19 of the hanger 15. As best illustrated in Fig. 2 of the drawings, the surface 22 substantially follows the contour of the arms between diverging portions 101 thereof but the load of the disposable fuel cell 16 in the receptacle 19 is primarily borne upon the pressure pads 102 which serve materially in supporting the surface 22 of the receptacle 19.

Located intermediate the ends of the diverging portions 101 of the arms 33 and 34 of the sway brace 32 are ejection means 105 of identical construction. Each ejection means 105 includes a cylinder 107 (Figs. 5 and 8) bored or otherwise formed in each of the arms 33 and 34.

Positioned in each of the cylinders 107 is an ejection piston 108, said piston having mounted upon its end a sleeve 110 which constitutes a receptacle for the reception of a pin 112 secured to the exterior of the disposable fuel cell 16. When the disposable fuel cell 16 is located within the receptacle 19 and the attachment means 75 thereof are held in the shackles 50 the shear pins 112 pass through the openings 27 and 28 in the surface 22 of the receptacle 19 and seat within the end of the sleeves 110 mounted on the pistons 108 of the ejection means 105.

When the actuating means 89 is energized to cause the piston 95 to move to the right, as best seen in Fig. 6 of the drawings, hydraulic fluid under pressure is fed into the cylinders 107 of the ejection means 105 to cause the pistons 108 to move outwardly in the cylinders 107 carrying the sleeves 110 mounted thereupon outwardly and thus simultaneously urging the pins in the same direction. The outward movement of the shear pins in the sleeves 110, as best shown in Fig. 6, causes the attachment means 75 to be carried out of engagement with the hooks 72 of the shackle 50 as they are moved into their attachment means releasing position by the action of the piston 95 of the actuating means 89. Of course, the ejection of the shear pins 112 by the action of the sleeves 110 causes the intermediate portions 17 of the disposable fuel cell 16 to be urged out of contact with the surface 22 of the receptacle 19 and projects the disposable fuel cell 16 into the airstream, preventing the inadvertent engagement of the fuel cell 16 with the hanger 15 or the receptacle 19 thereof after the fuel cell has been released from the shackles 50. This is a most important feature of my invention since it eliminates the possibility of damage to the aircraft by the fuel cell after it is released by the shackle.

An alternative embodiment of my invention is shown in Figs. 9 through 11, reference numerals being utilized in describing this alternative embodiment which are identical with those previously used in designating identical portions of the previously discussed embodiment. The hanger 115 of the alternative embodiment of my invention is mounted on the end 14 of a wing 12 and includes a substantially concave receptacle 117 which is provided with a surface 118 adapted to engage the peripheral area of that portion of a disposable fuel cell 120 which is located in the receptacle 117.

Formed in the surface 118 of the receptacle 117 are elongated slots 122 and 123 which are disposed in spaced relationship and in tandem with each other. Also formed in the surface 118 is a fuel and air inlet opening 124 which is adapted to permit fuel and air lines, not shown, to be connected to the disposable fuel cell 120. The hanger 115 is adapted to be utilized to suspend the disposable fuel cell 120 in its receptacle 117 by means of attachment means constituted by pins 126 which are disposed transversely of and located in arcuate depressions or slots 128 formed in the surface of the disposable fuel cell 120.

The pins 126 are substantially ellipsoidal in vertical cross section, as best shown in Fig. 11, and have tapered upper portions which may be flush or project slightly beyond the depressions 128 and thus enter the openings 122 and 123 in the surface 118 when the cell 120 is disposed in the receptacle 117. The pins 126 in the arcuate slots 128 in the surface of the disposable fuel cell 120 are engageable by shackles 130 which are mounted between the arms 33 and 34 of a sway brace 32.

The shackles 130 each include a pair of hooks 132, said hooks being mounted upon the ribs 35 of the sway brace 32 in substantially the same manner as the hooks 72 of the shackle 50 of the previously discussed embodiment. However, the hooks 132 are so mounted on the sway brace 32 that, when in the attachment means releasing position indicated by the numerals 132' of Fig. 11, they are retracted behind the surface 118 of the receptacle 117 of the hanger 115. However, when the hooks 132 are extended into attachment means engaging position, they are caused to move in an arc through the slots 122 and 123 in the surface 118 of the receptacle 117 and into the longitudinal slots 128 to engage the pins 126. Furthermore, as best shown in Figs. 11 and 13 of the drawings, the transverse and longitudinal configurations of the hooks 132 are such that when the hooks 132 are closed over the pins 126 in the slots 128, the hooks 132 fit snugly within the slots 128 and serve as shear connections between the hanger 115 and the disposable fuel cell 120. By so constructing the hooks 132 and the slots 128 of the receptacle 117, the necessity for the provision of separate shear pins is eliminated and a rigid and firm connection between the hanger 115 and the disposable fuel cell 120 is provided.

Although the shackles 130 have been shown and described as lying in horizontal planes to engage slots 128 lying in horizontal planes, the shackles and slots could be rotated 90° into vertical planes without departing from the spirit of my invention.

As best shown in Fig. 11 of the drawings, the locking means 80 and the ejection means 105 of the present embodiment are substantially identical with the locking means and the ejection means disclosed and discussed in the previouly described embodiment of my invention. The cam plate 82 of the locking means 80 is engaged by the tapered upper end of the pin 126 when the cell 120 is inserted in the receptacle 117 to release the locking means and to cause the hooks 132 to move through the opening 122 to engage the pin 126. When the hooks 132 are moved from the attachment means engaging position to the attachment means releasing position, as best shown in Fig. 11 of the drawings, the ejection means 105 serves to eject the disposable fuel cell 120 from the receptacle 117 of the hanger 115. However, since no shear pins are provided on the surface of the disposable fuel cell 120 the sleeves 110 merely contact the contiguous area of the periphery of the disposable fuel cell 120 which lies adjacent the ejection means 105. If desired, the sleeve 110 mounted on the piston 108 can be eliminated and a solid extension be substituted therefor since there is no necessity for a sleeve to receive the shear pins as in the case of the previously discussed embodiment. Ejection of the disposable fuel cell in an aft longitudinal direction is now possible by means of a drag producing device such as a parachute, drag air brake, etc., released simultaneously with the ejection of the cell.

I thus provide by my invention a hanger for maintaining a disposable or droppable object upon an aircraft which includes a receptacle having shackle means associated therewith adapted to engage attachment means mounted upon the disposable or droppable object, said hanger including a substantially airfoil-shaped receptacle adapted to snugly receive that portion of the disposable or droppable receptacle which is placed in contiguity thereto to reduce drag. Furthermore, there is associated with the shackle means of my invention lock means for maintaining the hooks constituting a portion of the shackle means in a position wherein they are adapted to receive the attachment means of the disposable receptacle as it is inserted therebetween, said lock means being engageable by said attachment means to permit the movement of the hooks into attachment means engaging position. Another feature of my invention is the provision of an adjustable mounting for the shackles thereof so that the shackles can be longitudinally shifted along axes perpendicular to the longitudinal axis of the receptacle of the hanger to permit the accommodation in said receptacle of various sizes of disposable containers.

Also of importance is the provision in the hanger of the ejection means adapted to eject the disposable container from the receptacle of the hanger when the shackles thereof have been released from the attachment means of said container. Another important feature of my invention is the provision of means in the hanger for preventing the disposable container from being dislodged from the receptable of the hanger by the imposition thereupon of forces in shear.

Although the hanger has been described as incorporated in the wing tips of an aircraft, it can be supported on a pylon 150 suspended from the under side of a wing 151, as best shown in Fig. 14 of the drawings.

I claim as my invention:

1. A hanger for securing an object having attachment means to an aircraft, including: a receptacle attached to said aircraft having a substantially continuous, concave, object engaging surface and having spaced pressure pads for engaging spaced portions of the under side of said surface and supporting same; shackle means secured to said aircraft adjacent said receptacle, said shackle means having an attachment means engaging position and alternatively an attachment means releasing position to respectively hold said object in and release it from said receptacle; lock means for maintaining said shackle means in said second position, said lock means being mounted upon said shackle means and releasable by contact of said attachment means therewith to permit said shackle means to return to said first position; and a remotely controllable actuator connected to said shackle means for changing said shackle means between said positions.

2. In a suspension device for temporarily mounting an object having attachment and positioning means provided on the periphery thereof on an aircraft having a wing, the combination of: a receptacle secured to the end of said wing, said receptacle having a concave surface conforming substantially to the configuration of said object, said surface being provided with a plurality of openings therein for the reception of said attachment and positioning means; a shackle secured to the interior of said wing adjacent one of said openings for receiving said attachment means to hold said object in said receptacle; and a structure secured to the interior of said wing adjacent and underlying said surface and adjacent another of said openings providing aperture means for engaging said positioning means.

3. In a suspension device for temporarily mounting an object having attachment and positioning means provided on the periphery thereof on an aircraft having a wing, the combination of: a receptacle secured to the end of said wing, said receptacle having a concave surface conforming substantially to the configuration of said object and being provided with a plurality of openings therein for the reception of said attachment and positioning means, said receptacle including a sway brace, portions of said sway brace mounted within the wing and additional portions of the sway brace engaging said concave surface for supporting said surface under the load of said object; and a shackle secured to the interior of said wing adjacent one of said openings for receiving said attachment means to hold said object in said receptacle.

4. In a suspension device for temporarily mounting an object having attachment and positioning means provided on the periphery thereof on an aircraft having a wing, the combination of: a receptacle secured to the end of said wing, said receptacle having a concave surface conforming substantially to the configuration of said object and being provided with a plurality of openings therein for the reception of said attachment and positioning means, said receptacle including a sway brace secured to the interior of said wing having spaced pressure pads disposed beneath said surface for engaging the under side of and supporting said surface under load and being provided with aperture means for receiving said positioning means on said object; and a shackle secured to the interior of said wing adjacent one of said openings for receiving said attachment means to hold said object in said receptacle.

5. In a suspension device for temporarily mounting an object having attachment and positioning means provided on the periphery thereof on an aircraft having a wing, the combination of: a receptacle secured to the end of said wing, said receptacle having a concave surface conforming substantially to the configuration of said object, said surface being provided with a plurality of openings therein for the reception of said attachment and positioning means; a shackle secured to the interior of said wing adjacent one of said openings for receiving said attachment means to hold said object in said receptacle, said shackle being adjustably mounted in the interior of said wing to permit said shackle to be moved toward or away from said opening; and a structure secured to the interior of said wing adjacent and underlying said surface and adjacent another of said openings providing aperture means for engaging said positioning means.

6. In a suspension device for temporarily mounting an object having attachment and positioning means provided on the periphery thereof on an aircraft having a wing, the combination of: a receptacle secured to the end of said wing, said receptacle having a concave surface conforming substantially to the configuration of said object, said surface being provided with a plurality of openings therein for the reception of said attachment and positioning means; a shackle secured to the interior of said wing adjacent one of said openings for receiving said attachment means to hold said object in said receptacle; a lock on said shackle actuable by said attachment means of said object and releasable by said attachment means for causing said shackle to engage said attachment means; and a structure secured to the interior of said wing adjacent and underlying said surface and adjacent another of said openings providing aperture means for engaging said positioning means.

7. In an aircraft having a wing, the combination of: a receptacle secured to the end of said wing for receiving an object having attachment means to be carried by said aircraft, said receptacle including a sway brace having spaced arms operatively connected to one another; a plurality of pairs of hooks adjustably mounted on said operative connection between said arms for adjustment along axes perpendicular to the longitudinal axis of said sway brace, said hooks being engageable with said attachment means of said object to hold said object in said receptacle, said hooks having an attachment means engaging position and alternatively an attachment means releasing position; a remotely controllable actuator for changing said hooks from said engaging position to said releasing position; lock means mounted adjacent said hooks and engageable by said attachment means of said object for changing said hooks from said releasing position to said engaging position to engage said atachment means; and ejector means mounted in each of said arms and adapted to exert pressure against said object to eject it from said receptacle as said hooks move from said engaging position to said releasing position to release the attachment means of the object.

8. In a mounting device for releasably securing to an aircraft an object having attachment means, the combination of: a receptacle on the aircraft having a substantially continuous concave contacting surface adapted to receive and contact the substantially convex surface area of an object; hook means mounted within the aircraft and adjustable toward or away from the object being held to permit the holding in said receptacle of objects of different diameters; actuator means attached to said hook means and remotely controllable from within the aircraft for opening said hooks to receive or release the attachment means of an object; lock means on said hook means holding the hooks thereof in open position, said lock means being releasable upon contact with the attachment means of an object to close said hooks around said attachment means and hold said object within the receptacle; and ejector means mounted within the aircraft adjacent the object, said ejector means contacting the object and applying pressure thereto to eject the object from the receptacle when said hook means are released.

References Cited in the file of this patent

UNITED STATES PATENTS

| | | |
|---|---|---|
| 815,393 | Wheless | Mar. 20, 1906 |
| 2,245,270 | Goode | June 10, 1941 |
| 2,417,342 | Bach | Mar. 11, 1947 |
| 2,421,699 | Johnson | June 3, 1947 |
| 2,461,406 | Birk et al. | Feb. 8, 1949 |
| 2,547,226 | Michael | Apr. 3, 1951 |
| 2,550,380 | Redford | Apr. 24, 1951 |

FOREIGN PATENTS

| | | |
|---|---|---|
| 158,673 | Austria | Dec. 15, 1939 |
| 293,144 | Italy | Feb. 12, 1932 |
| 419,895 | Great Britain | Nov. 21, 1934 |
| 616,739 | Great Britain | Jan. 26, 1949 |